US012485297B2

(12) United States Patent
Murphy et al.

(10) Patent No.: US 12,485,297 B2
(45) Date of Patent: Dec. 2, 2025

(54) SYSTEMS AND METHODS FOR CRANIAL SELF-REGISTRATION FOR ULTRASOUND NEUROMODULATION WEARABLES

(71) Applicant: Attune Neurosciences, Inc., San Francisco, CA (US)

(72) Inventors: Keith R. Murphy, San Francisco, CA (US); Ehsan Dadgar-kiani, North Grafton, MA (US); Tommaso Di Ianni, San Francisco, CA (US)

(73) Assignee: Attune Neurosciences, Inc., San Francisco, CA (US)

( * ) Notice: Subject to any disclaimer, the term of this patent is extended or adjusted under 35 U.S.C. 154(b) by 0 days.

(21) Appl. No.: 18/904,706

(22) Filed: Oct. 2, 2024

(65) Prior Publication Data

US 2025/0108235 A1  Apr. 3, 2025

Related U.S. Application Data

(60) Provisional application No. 63/587,549, filed on Oct. 3, 2023.

(51) Int. Cl.
 *A61N 7/00* (2006.01)
(52) U.S. Cl.
 CPC ........ *A61N 7/00* (2013.01); *A61N 2007/0026* (2013.01); *A61N 2007/0052* (2013.01)

(58) Field of Classification Search
 CPC .............. A61N 7/00; A61N 2007/0026; A61N 2007/0052; A61N 7/02; A61N 2007/0078; A61N 2007/0095
 See application file for complete search history.

(56) References Cited

U.S. PATENT DOCUMENTS

| 9,247,921 | B2 * | 2/2016 | Provost ................... A61N 7/02 |
| 10,028,723 | B2 * | 7/2018 | Konofagou .......... A61B 8/0808 |
| 2023/0166129 | A1 * | 6/2023 | Murphy ................... A61N 7/00 |
| | | | 601/2 |

* cited by examiner

*Primary Examiner* — Joel Lamprecht
(74) *Attorney, Agent, or Firm* — Nixon Peabody LLP; Ilya S. Mirov

(57) ABSTRACT

A neuromodulation system is disclosed that comprises a neuromodulation device and a stimulation control computing environment. The disclosed device can include at least one ultrasound-emitting element. The stimulation control computing environment can be configured with data processing functions to focus ultrasound emission to a target brain region. The system can identify an initial position of the one or more ultrasound-emitting elements with respect to a temporal window of a user, use brain image to identify the target brain region, and perform first acoustic simulations to determine information for use in focusing ultrasound emissions from the initial position to the target brain region. The system can detect a shift of the one or more ultrasound-emitting elements with respect to the temporal window to a secondary position and perform second acoustic simulations to determine information for use in focusing ultrasound emissions from the secondary position to the target brain region.

11 Claims, 11 Drawing Sheets

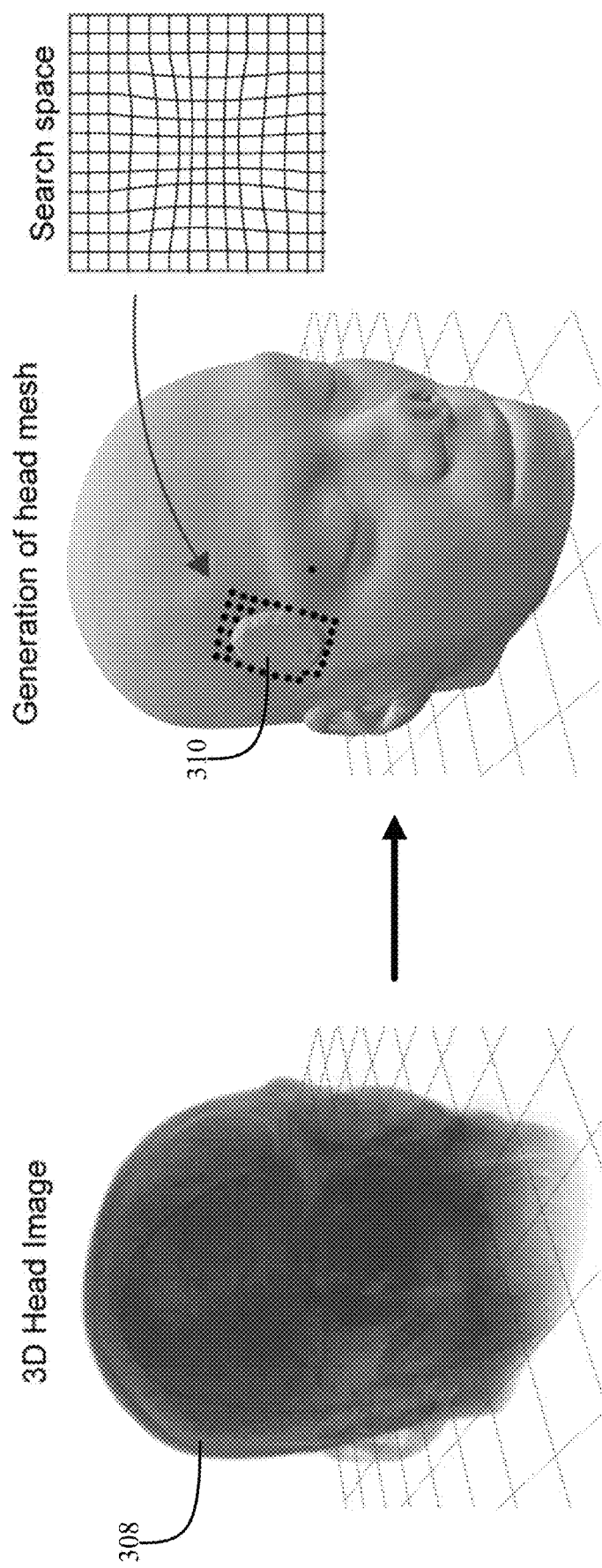

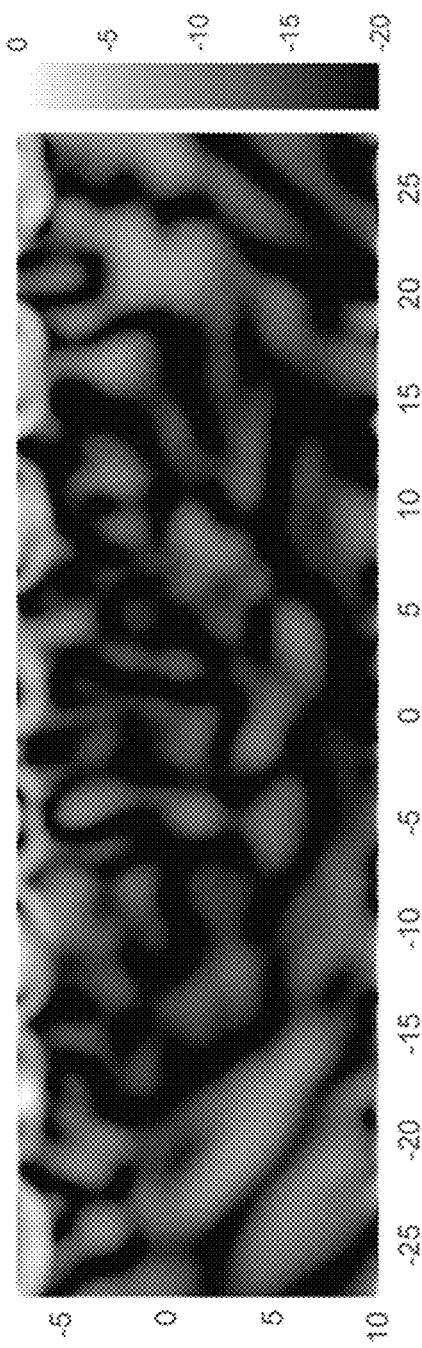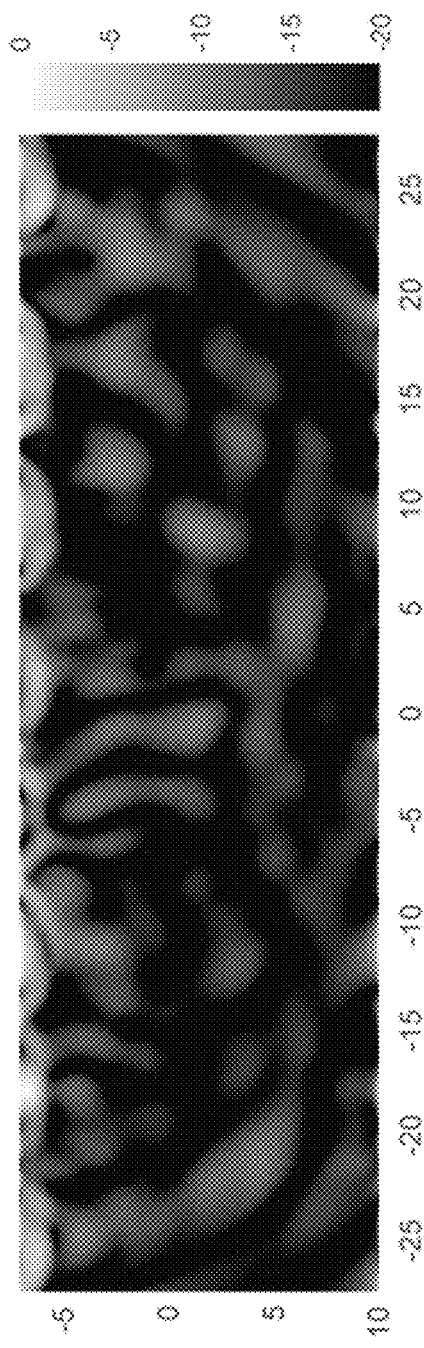
FIG. 5

SYSTEMS AND METHODS FOR CRANIAL SELF-REGISTRATION FOR ULTRASOUND NEUROMODULATION WEARABLES

CROSS-REFERENCE TO RELATED APPLICATION

This application claims the benefit of U.S. Provisional Application No. 63/587,549, filed Oct. 3, 2023, which is incorporated by reference herein in its entirety.

FIELD

The present disclosure generally relates to devices, and associated systems, methods, and uses for modulating brain activity using ultrasound stimulation.

BACKGROUND

Focused ultrasound (FUS) is recognized as a potent tool for non-invasive modulation of intact brain circuits. It is particularly advantageous since, unlike pharmacologic or other existing forms of non-invasive brain stimulation approaches, it can be used to target specific, deep regions of the brain with high spatial and temporal precision. Existing commercial FUS systems are designed exclusively for in-clinic use and require stereotactic or real-time magnetic resonance imaging (MRI)-based targeting of the ultrasound beam, making them impractical for use outside of the clinical setting. Moreover, no existing FUS device can be operated in the absence of a provider or clinician guiding their placement in real-time, precluding the application of those systems for repeated use cases such as nightly sleep enhancement. Traditional systems and methods are not equipped to correct for nighttime device migration that can be caused when the device encounters external structures like a pillow or the user's arm.

The embodiments disclosed herein are directed to addressing these and other considerations.

SUMMARY

The disclosed systems and methods are configured to target FUS energy to certain target regions of the brain. In one embodiment, the centromedian nucleus of the thalamus (CMT) can be targeted, which is the core of slow wave sleep generation, and is inaccessible by traditional non-invasive neuromodulation devices. The CMT is an ideal stimulation target for initiating and maintaining sleep, as it is intimately linked with the cortex through the well described thalamo-cortical circuit to entrain network oscillations. Examples consistent with the disclosed embodiments are effective for enhancing slow waves through precisely timing thalamic stimulation with cortical slow oscillations (measured by EEG electrodes) using a closed-loop method. However, it is likely that sleeping with the device can cause further shifts, particularly when encountering external structures like a pillow or the user's arm. Maintaining accurate beam targeting throughout the night is paramount to closed-loop applications and traditional methods are not suited to correcting for nighttime device migration. Furthermore, the careful placement of the device using the registration tool is an effective but burdensome part of the user experience that could be alleviated if the transducers could continuously register their location to the underlying anatomy.

In other embodiment, different target brain regions can be selected to treat a variety of different conditions. For example, one or more of the CMT, the subthalamic nuclei of the thalamus, Globus pallidus interna (GPI), Ventral Intermediate Nucleus of the Thalamus, the substantia nigra, locus coeruleus, the ventral tegmental area, and the prefrontal cortex can be targeted using the disclosed devices, systems, and methods. In some embodiments, the disclosed devices, systems, and methods are effective for the treatment of Parkinson's disease (PD). In other embodiments, the disclosed devices, systems, and methods can be utilized for enhancing sleep. In yet other embodiments, the disclosed devices, systems can be utilized to enhance physical or mental exercises by using FUS targeted to arousal or cognitive systems in the brain. In yet other embodiments, the device can be used at home for treatment of addiction without requiring any special fitting methodology.

Herein, we disclose a neuromodulation system capable of cranial self-registration, allowing accurate brain targeting irrespective of the neuromodulation device placement or movement with respect to the wearers head. Cranial self-registration is accomplished by including one or more imaging ultrasound elements in the neuromodulation device and providing software functionality that is configured to continuously derive updated beam focusing parameters using real-time ultrasound-emitting element locations mapped to the underlying cranial morphology of a user.

In another aspect of the present disclosure, methods for estimating relative translational and rotational displacements of ultrasound transducer elements (Ta) through analysis of serially captured cranial volumetric ultrasound data are disclosed. The output displacements Ta are used to accurately simulate acoustic propagation for computing ultrasound focusing parameters in a neuromodulation device. The system implements at least one machine learning model, such as a deep neural network, that is trained to detect features indicative of the displacements Ta in paired ultrasound datasets. A head-mounted array of ultrasound elements is used to acquire a reference volumetric dataset made of signals received by individual transducer elements ($UV_{Ref}$) during an initial CT or MRI scan. During subsequent use, volumetric ultrasound data ($UV_{RT}$) are periodically acquired. The paired data sets or combinations thereof are fed into the displacement detector system. This system estimates displacement through search of possible transducer positions and orientations constrained to the CT/MRI surface, or through differentiation of the acoustic simulation output. The output is then used to reposition the simulated ultrasound transducer array in cranial CT or MRI derived acoustic space ($A_{sp}$) to accurately compute updated temporal or phase offsets, which correct for cranial phase aberrations for a given brain target. The real time ultrasound volume displacement correction, according to the present disclosure, allows a focused ultrasound stimulating device to maintain ultrasound waveform delay-based targeting following a positional displacement of the focused ultrasound device relative to the target. The displacement of the device may be a result of adjustment of a wearable for comfort, incidental displacement from environmental factors such as contact with a pillow, or disorders which produce mechanical force such as Parkinson's disease and essential tremor.

BRIEF DESCRIPTION OF THE DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1B showing exemplary hardware components of a neuromodulation device disclosed herein; and FIG. 1C showing a cranial transducer mapping display of a user wearing the neuromodulation device of FIG. 1A-1B.

FIG. 3A represents an exemplary MRI scan associated with a user's brain, according to aspects of the present disclosure.

FIG. 3B represents an exemplary head mesh generated by the exemplary neuromodulation system of FIG. 1A based on the MRI scan of FIG. 3A, according to aspects of the present disclosure.

FIG. 5 depicts cranial tissue mapping using low frequency ultrasound, according to aspects of the present disclosure.

DETAILED DESCRIPTION

Figure 1A:
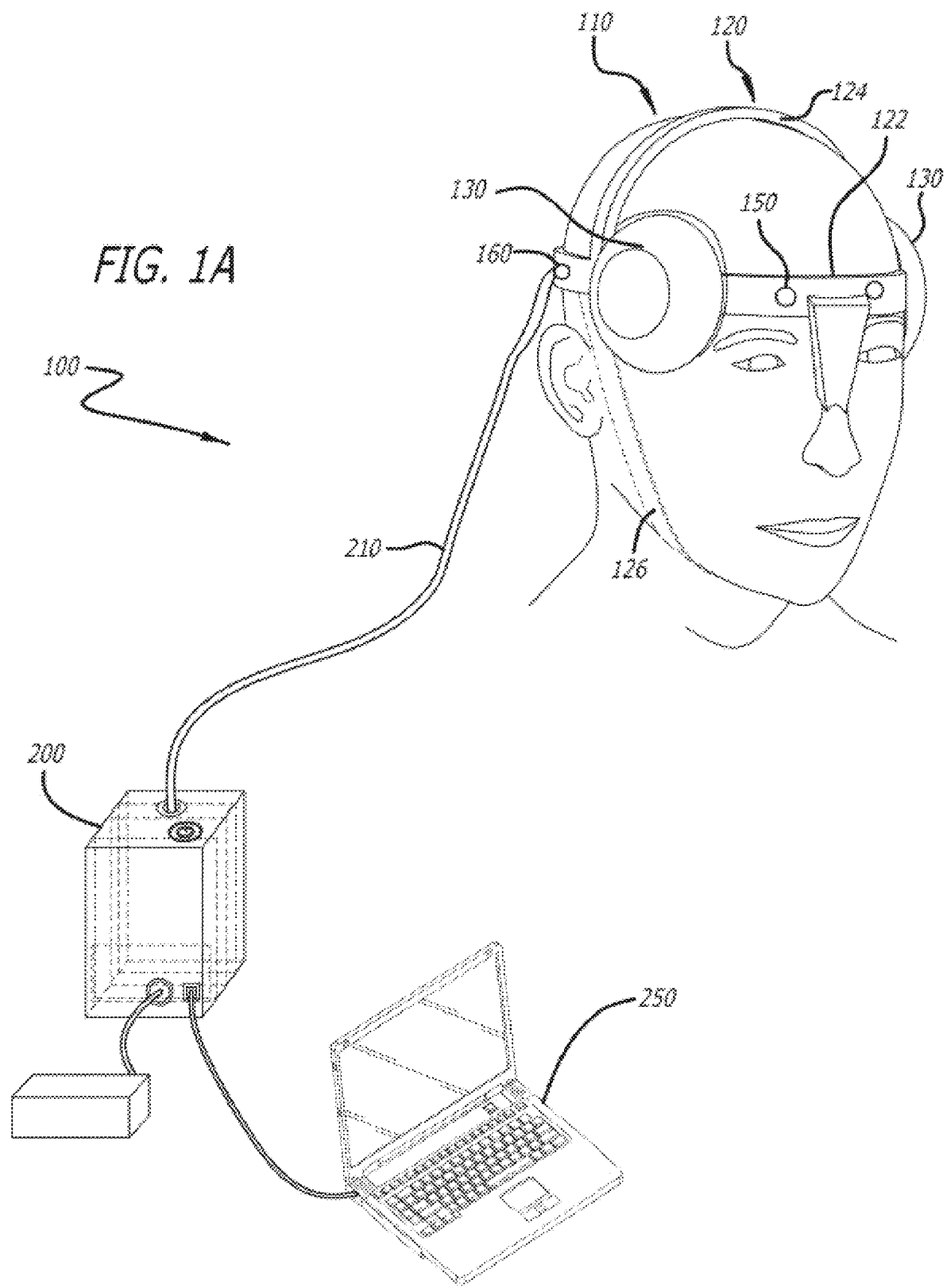
FIGS. 1A-C are schematics of an exemplary neuromodulation system disclosed herein with FIG. 1A showing a neuromodulation device and a stimulation control computing environment disclosed herein.

Focused ultrasound can be used to modulate neural activity through the manipulation of ion channels and membrane capacitance. Specifically, high pressure, cavitation, or radiation force can be sensed by various mechanically gated channels such as channels belonging to the Transient Receptor Potential channels, inward rectifying potassium channels, or piezo channels, among others. Manipulation of these channels can lead to either increases or decreases in neural activity depending on the neural target and ultrasound parameters employed. The parameters varied may include pulse repetition frequency, duty cycle, peak or average intensity, and pressure distribution profile.

To employ target specific brain structures with ultrasound for central nervous system applications, ultrasound focusing is used with numerous wave fronts propagating across highly heterogeneous tissue. For example, a wave may pass through cortical bone, trabecular bone, bone marrow, red blood cells, neuronal sheathing, and cerebrospinal fluid, all before it reaches its intended target. Since all of these tissue types have different characteristic speed of sound, the time it takes for a wave to traverse from its source to its intended target may be dramatically different than another wave sourced over another part of the skull. Thus, accurate knowledge of both the position of the wave sources, as well as the acoustic characteristics of tissue between the source and the brain target is used for proper ultrasound focusing.

Information about acoustic properties across the cranium can be effectively derived from a computed tomography (CT) scan, or variants of a magnetic resonance imaging (MRI) scan such as a zero-echo time (ZTE), a type of ultra-short echo time (UTE) scan. The position of ultrasound emitting sources, or ultrasound emitting elements, can be calculated by identifying the position of fiducial markings spatially registered to the sources themselves. Together, this information can allow for ultrasound focusing so long as the position of the ultrasound sources remains accurate. However, physical displacement of the ultrasound elements could dramatically alter the ultrasound focal target within the brain or distribute the focal pressure across a wider area. Either of these outcomes could potentially reduce the clinical efficacy of a treatment or produce unintended side effects related to off target regions of the brain. As a result, focused ultrasound neuromodulation devices preferably utilize real time fiducial position monitoring which is the gold standard for existing focused ultrasound therapy systems. "Offline" focused ultrasound devices, which rely on pre-calculated positioning, may not be sufficiently accurate in view of differences between actual positions and the pre-calculated positions of the ultrasound devices. There is a great need for technology which can assess positional accuracy and correct for any changes in the position during actual use.

At present, there are various methodologies for real time fiducial based registration of the transducer to a subject's brain image data. For high intensity focused ultrasound ablation procedures requiring focal precision and accuracy, a stereotactic frame holds the subject's head in place inside an MRI scanner. Images are captured with the MRI scanner and registered to a CT taken prior to the procedure and the CT is then mapped to fiducials on the ultrasound array. Although this method offers excellent targeting, the concurrent use of an MRI scanner precludes many applications of focused ultrasound. Another commonly used method in neuromodulation employs a set of infrared reflective markers placed either directly on cranial landmarks, such as the nose, or on a device which is registered to a subject's head. The markers used in this method are detected by an external camera having sufficient visual access to the markers and relies on accurate consistent placement of the fiducial markers or the accessory device containing the markers.

Ultrasound signals can carry meaningful signals related to tissue morphology, particularly with imaging probes where high frequency linear arrays are used with very short pulses. Thus, ultrasound itself may serve as a useful tool for identifying position relative to morphology. It is possible to use high frequency ultrasound scans to localize anatomical features of the skull surface for registration to prior CT data.

The CT data can then be used for skull-related phase aberration correction and high intensity focused ultrasound treatment targeting. Because lowering ultrasound frequency substantially decreases the axial and lateral resolution, the method uses a dedicated high-frequency ultrasound probe for high resolution image capture required for CT registration. In particular, transducers used to image the skull surface often operate above 10 MHz, while therapeutic transducers are typically designed to operate between 250-750 kHz. Similarly, ultrasound images can be used to approximate the position of a probe or an associated medical device. Use of the word image in this context refers to the accurate representation of the tissue being imaged. Obtaining an "image" of tissue is not practical or arguably possible at frequencies below about 1 MHz. Thus, both of the methods described above rely on coherent ultrasound images and neither allows for a single transducer to be used for both CT registration (high frequency >1 MHz) and low frequency (<1 MHz) therapeutic ultrasound applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

The skull is highly absorbent and reflective of sound given its density and difference in acoustic impedance from neighboring tissues. Given the direct relationship between ultrasound frequency and absorption and reflection/refraction, therapeutic ultrasound transmission through the skull often uses very low operating frequencies between 250 and 750 KHz. Although these low frequencies transmit through the skull much better than high frequencies, they are not typically used in ultrasound imaging due to wavelength limitations on image resolution. Additionally, the high internal and external reflectivity of the skull may cause multiple layers of waves to return to the transducer receiver at time intervals which do not correlate with distance from their origin. Thus, it is difficult to reconstruct images from low frequency cranial ultrasound. Despite this limitation, signals related to the cranial tissue can still be transmitted and received using low frequency ultrasound. While these patterns have very little bearing on the spatial morphology of the cranium (See FIG. 5) it is still possible that they can be matched across time. Simply put, a snapshot of the signals should remain stable assuming the cranial tissue and transducer have not changed positions. Furthermore, dramatic changes in the pattern even with subtle movements may still have non-obvious characteristic changes indicative of placement motion. A method for assessing changes in ultrasound probe position using changes in these patterns is described herein.

Figure 1B:
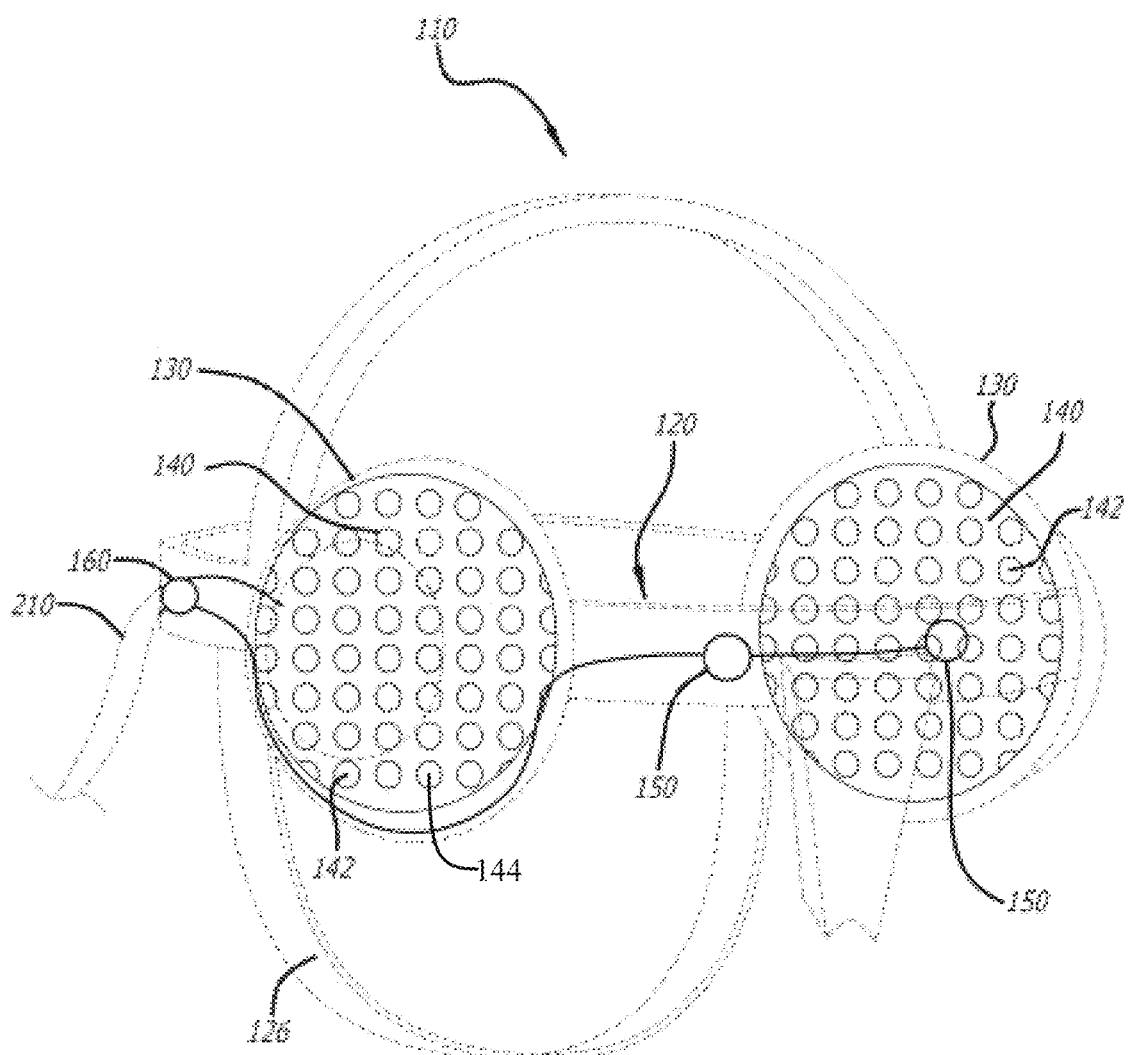

In some embodiments, and as shown in FIGS. 1A-B, an exemplary neuromodulation device 110 can include a wearable device housing 120, which can support two array housings 130 each containing an ultrasound transducer array 140, and may include two EEG electrodes 150, such as, e.g., active dry EEG electrodes. When worn, wearable device housing 120 is configured to encircle the cranium in a transverse plane that positions the main band along the forehead, temples and back of the head. Wearable device housing 120 provides rigid stereotactic placement of ultrasound transducer arrays 140 over the temporal window 310 of the user's head as well as positions EEG electrodes 150 flat against the user's forehead. According to some embodiments, the EEG electrodes 150 can be used to measure cortical brain activity during sleep.

Wearable device housing 120 can include a main band 122, a secondary band 124, and an optional securing strap 126. Main band 122, secondary band 124 and securing strap 126 can be adjustable to facilitate accurate positioning and securing of neuromodulation device 110 to a user's cranium. Secondary band 124 can be attached to main band 122 via first and second secondary band attachment points and configured to extend over the top of the head. First and second band attachment points can be static or configured to allow movement between secondary band 124 and main band 122. Optional securing strap 126 is attached to main band 122 via first and second securing strap attachment points and configured to extend under the chin. First and second securing strap attachment points can be static or configured to allow movement between securing strap 126 and main band 122. In aspects of these embodiments, main band 122 has front and back portions composed of a semi-rigid material and side or temple portions composed of a flexible material, secondary band 124 and a first and second attachment hubs each being composed of a semi-rigid material, and a securing strap being composed of an elastic material.

Neuromodulation device 110 can include one or more ultrasound transducer arrays 140 contained in a housing attached to main band 122 of wearable device housing 120. The one or more ultrasound transducer arrays 140 can be located on the inner surface of main band 122 and configured to interface with a user's cranium. In some embodiments, a neuromodulation device disclosed herein contains a single ultrasound transducer array 140 located on the main band. In some embodiments, neuromodulation device 110 contains a single ultrasound transducer array 140 located on one side of main band 122 positioned at either the left or right temple region of a user above the ears. In some embodiments, neuromodulation device 110 contains a single ultrasound transducer array located on each side of main band 122 positioned at the left and right temple region of a user above the ears. In some embodiments, neuromodulation device 110 contains multiple ultrasound transducer arrays 140 located on each side of main band 122 positioned at the left and right temple region of a user above the ears. In aspects of these embodiments, and as shown in FIG. 1A-B, neuromodulation device 110 comprises two ultrasound transducer arrays 140 one located on the left side of main band 122 and one located on the right side of main band 122. In aspects of these embodiments, neuromodulation device 110 comprises two ultrasound transducer arrays 140 located on the left side of main band 122 and two ultrasound transducer arrays 140 located on the right side of main band 122. It should be understood, that while each ultrasound transducer array 140 is shown having a plurality of ultrasound-emitting elements 142, in some embodiments, each ultrasound transducer array 140 can comprise a single ultrasound-emitting element 142. Additionally, each ultrasound transducer array 140 can include one or more imaging ultrasound elements 144, as will be further described with respect to FIG. 4. In some embodiments, the neuromodulation device 110 can optionally include photoplethysmography (PPG) sensors (not shown). In some embodiments, the neuromodulation device 110 can include one or more accelerometers (not shown) that may be used to capture head movement of a user wearing the neuromodulation device 110.

In some embodiments, custom padding and a detachable fit tool (not shown in FIGS. 1A-1C) allow the neuromodulation device 110 to maintain consistent, repeated positioning of the transducers across sessions. The ultrasound-emitting elements 142 can be designed to interface with the "temporal window" 310 (see FIG. 3B), a thin portion of skull bone posterior to the eyes that allows access to centralized deep brain structures. In some embodiments, the neuromodulation system 100 determines ultrasound beam steering parameters that are unique to each person's brain and skull morphology that are used to accurately target certain brain regions with FUD. In some embodiments, the neuromodulation system 100 utilizes a combination of custom automated MRI scan segmentation, transducer spatial mapping, and acoustic simulation tools to optimize offline targeting of brain regions.

As shown in FIGS. 1A-B, neuromodulation device 110 can contain EEG electrodes located on the inner surface of main band 122 and configured to interface with a user's cranium. In some embodiments, neuromodulation device 110 contains a single EEG electrode located on the front portion of main band 122 positioned at the forehead of a user above the eyebrows. In some embodiments, neuromodulation device 110 contains multiple EEG electrodes, each located on the front portion of main band 122 positioned at the forehead of a user above the eyebrows. In aspects of these embodiments, and as shown in FIGS. 1A-B, neuromodulation device disclosed herein comprises two EEG electrodes 150 each located on the front portion of main band 122 with one positioned above the left eyebrow of a user and the other positioned above the right eyebrow of the user. However, it should be understood that in other embodiments, the number and specific positioning of EEG electrodes 150 can be varied.

A single EEG electrode, or a plurality of EEG electrodes comprising a neuromodulation device disclosed herein provides sufficient sensitivity to provide optimal measurement of brainwave activity, including, without limitation, wave frequency, wave amplitude, and waveform type in order to effectively identify one or more characteristics, phases or states of brain activity. In aspects of this embodiment, a neuromodulation device disclosed herein comprises a plurality of EEG electrodes having sufficient sensitivity to detect and measure alpha waves, theta waves, delta waves, sleep spindles, K complexes, or any combination thereof.

Neuromodulation device 110 can comprise a planar, open-curved arc, or closed-curved arc configuration of EEG electrodes. The planar, open-curved arc, or closed-curved arc configuration of EEG electrode is a configuration designed to provide optimal measurement of brainwave activity, including, without limitation, wave frequency, wave amplitude, and waveform type in order to effectively identify one or more characteristics, phases or states of brain activity. In some embodiments, a neuromodulation device disclosed herein is a one-dimensional planar, curved or closed curved arc configuration of EEG electrodes. In some embodiments, each EEG electrode can be controlled in isolation, or in clusters to reduce cabling.

A neuromodulation device disclosed herein further contains conductive wiring. Such conductive wiring can be located exteriorly on the device housing or embedded within wearable device housing 120, such as, e.g., within a channel, and will exit the housing through a port located at the back. In some embodiments, the conductive wiring will exit cable port 160 parallel to the cranium in the anterior-posterior direction allowing the user to lay on his back against the flush wires. Conductive wiring disclosed herein powers an EEG amplification stage for each EEG electrode 150, each ultrasound transducer array 140, stimulation control unit 200 and its associated processing elements and functions, and other components of neuromodulation device 110 and can be bundled together. In some embodiment, conductive wiring runs through a channel within main band 122 connecting each EEG electrode 150 to one or more amplifiers, a digital analog converter, and a stimulation control unit 200 before exiting via cable port 160 located at a back portion of main band 122. In some embodiment, and with respect to each ultrasound transducer array 140, conductive wiring runs through a channel within main band 122 connecting each ultrasound transducer array 140 to stimulation control unit 200 before exiting via cable port 160 located at a back portion of main band 122.

Aspects of the present specification disclose a neuromodulation system comprising a stimulation control computing environment including a stimulation control unit and a computing device. Referring to FIG. 1A, neuromodulation system 100 further contains a stimulation control unit 200 located on main band 122 or tethered to main band 122 with conductive wiring 210 via a cable port 160. Stimulation control unit 200 comprising a central control ASIC processor, a printed circuit board (PCB) component which contains an ultrasound phase control component, one or more signal amplifiers, an ultrasound matching network as well as a power source and other processors. The ASIC chip processes EEG data, ultrasound state data, ultrasound-emitting element target phase data, power usage, and data storage. This ASIC processor sends information regarding element phase which triggers the ultrasound phase control component and one or more signal amplifiers of the PCB component. This PCB component then sends signals to the ultrasound matching network to reduce reflections from acoustic impedance mismatch and then to each ultrasound-emitting element 142 of ultrasound transducer array 140, which allow for beam steering on neuromodulation device 110. The battery unit contained in stimulation control unit 200 is appropriately current and voltage rated for the needs of neuromodulation device 110. Stimulation control unit 200 uses an input file regarding phase delays for each target structure, which can be subdivisions of a single target as well as a stimulation protocol for each target. This file is loaded through a bus interface, such as, e.g., a LIGHTNING connector, a micro-USB connector, a USB-C connector, and the like, and is derived through acoustic simulations performed on a brain image set of the user wearing neuromodulation device 110. The simulation maps patient's target brain regions relative to ultrasound-emitting elements 142 of each ultrasound transducer array 140 and appropriately phase corrects each element timing such that a beam focuses on the target.

Referring to FIG. 1A, a stimulation control computing environment disclosed herein also comprises a computing device 250 comprises an algorithmic framework including one or more processors and a plurality of software and hardware components (including a digital analog converter, function generator, and hard drive) configured to execute program instructions or routines to perform the data processing and performance functions that controls the operability of a neuromodulation device disclosed herein. In certain embodiments, computing device 250 can comprise an offline computing device. In certain embodiments, computing device 250 can comprise a cloud computing environment that is connected to other components of the neuromodulation system 100 over a network, such as the Internet.

An algorithmic framework of stimulation control unit 200 and software elements disclosed herein is part of the one or more systems and methods that apply mathematical functions, models or other analytical and data processing techniques in real-time to ensure a neuromodulation device disclosed herein applies ultrasound stimulation in an appropriate spatial and temporal manner to one or more specific regions of the brain separately and differentially in response to the brain activity data obtained by an EEG electrode.

Figure 1C:
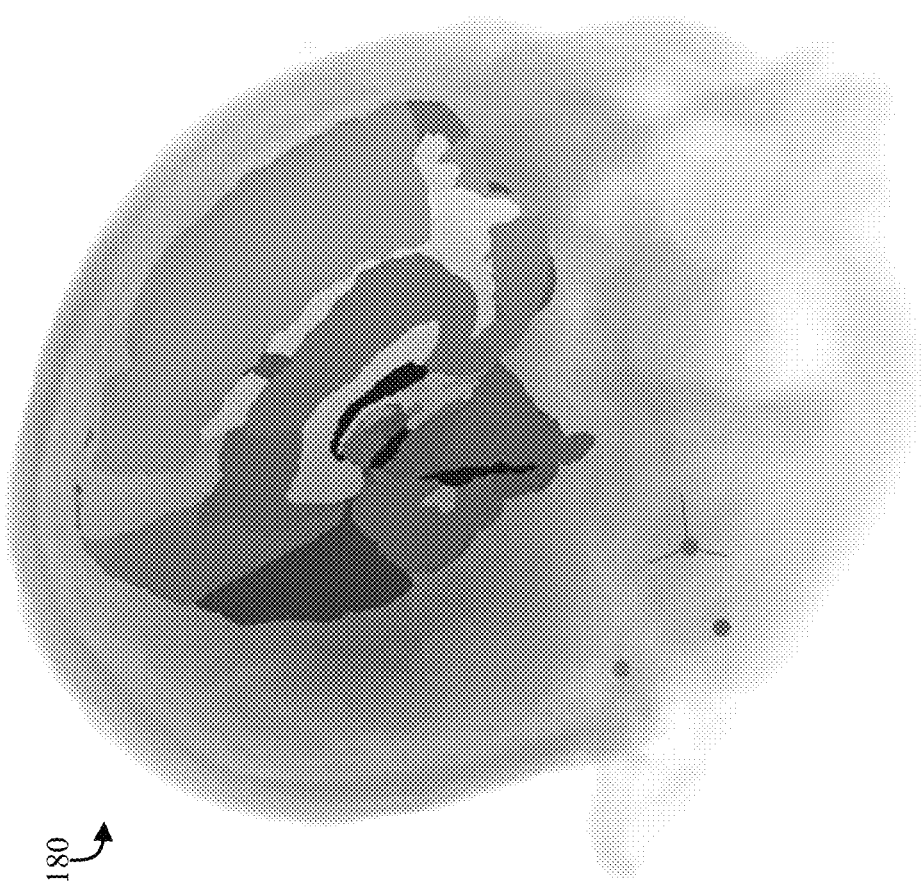

Referring now to FIG. 1C, the neuromodulation device 110 is configured to generate a mapping 180 of a user's brain using standard brain atlas registration methods with anatomically resolving MRI data. These brain regions labeled in the registered map have known positions relative to the one or more ultrasound-emitting elements 142 allowing for acoustic simulations targeting ultrasound to each brain region using the one or more ultrasound elements.

In some embodiments, when using the neuromodulation system 100 to target the centromedian nucleus of the thalamus, the focal size that can be achieved by the neuromodulation device 110 is approximately 4 mm wide in some embodiments. Given this restricted field size, target accuracy is critical for effective neural stimulation. A preliminary device placement study found an average lateral transducer placement error of 2.1±1.3 mm (mean±S.D.) across sessions. Using this error range, lateral transducer position displacement was simulated and a −12% drop in pressure at the focus at 2.1 mm error was determined, resulting in a 14% increase in beam volume may increase undesirable off-target effects. Although these measurements are applicable to the initial placement of the neuromodulation device 110, it is likely that sleeping with the device will cause further shifts, particularly when encountering external structures like a pillow or the user's arm.

Cranial self-registration technology is disclosed herein that allows accurate brain targeting irrespective of the placement or movement of the neuromodulation device 110 on the user's head. To achieve cranial self-registration, the disclosed neuromodulation system 100 can integrate imaging ultrasound elements 144 (see FIG. 4) into the neuromodulation device 110 that are configured for dual transmit and receive capability. The neuromodulation system 100 can include hardware and firmware for imaging signal acquisition and processing and a cloud-based software for continuous, computationally demanding, derivation of updated beam focusing parameters using real-time transducer locations mapped to the underlying cranial morphology. Accordingly, the disclosed neuromodulation system 100 is capable of deriving 3D positions and orientation of each ultrasound transducer array 140 and its elements (e.g., ultrasound emitting elements 142 and imaging ultrasound elements 144) relative to MRI space.

To achieve cranial self-registration, one or more highly sensitive imaging frequency (2-3 MHz) ultrasound elements 144 are integrated into the into the ultrasound transducer array(s) 140 by taking advantage of empty space between ultrasound-emitting elements 142. Unlike ultrasound-emitting elements 142, imaging ultrasound elements 144 can be electronically connected to preamplifier circuits to enable receive capability. Generally, increasing the number of ultrasound-emitting elements 142 and imaging ultrasound elements 144 increases the resolution of skull contour mapping at the potential cost of mechanical design complexity and analysis speed. These considerations can be balanced by simulating the correlation between element count and synthetic imaged vs real bone contour fit and choosing an optimal number of elements such that contour mapping is optimized while minimizing the effect on mechanical design complexity and analysis speed.

Figure 2A:
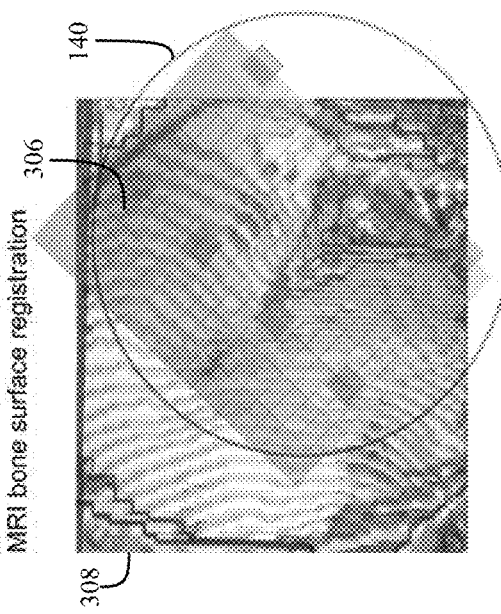
FIG. 2A represents 1D structural data collected by one or more ultrasound-emitting elements according to aspects of the present disclosure.
Figure 2B:
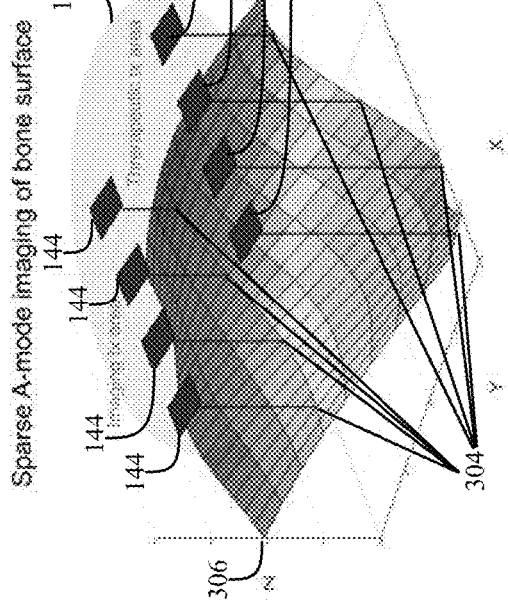
FIG. 2B represents a contour surface of a patient's temporal window mapped to one or more ultrasound-emitting elements, according to aspects of the present disclosure.

FIG. 2A depicts the use of one or more imaging ultrasound elements 144 for mapping cranial bone surfaces using ultrasound imaging. Although eight imaging ultrasound elements 144 are shown in FIG. 2A, any number of imaging ultrasound elements 144 can be utilized to map the cranial bone surfaces. In one embodiment, three imaging ultrasound elements 144 are included in each ultrasound transducer array 140. Briefly, each imaging ultrasound element 144 can be configured to pulse independently while receiving signal echoes (e.g., a return signal) to generate 1D structural data 304 along its orthogonal projection associated with the temporal window 310. In FIG. 2B, the 1D structural data 304 captured by each imaging ultrasound element 144 can be combined to construct a 2D contour surface 306 which can be registered to an existing surface 308 (e.g., denoted by image data associated with the user of the neuromodulation system 100, such as MRI image data). In certain disclosed embodiments, the return signal, which represents time since transmit, can be decomposed to identify the distance to the outer bone interface of the temporal window 310. A hypothetical array of signals is represented as (t) in FIG. 2C. All distances can be compared to the previous time point (t−1) using an iterative closest point (ICP) analysis. ICP analysis is a computationally fast, standardized method for registering point clouds, or a series of 3D points, to return the transformation matrices and registration fit metrics for two compared clouds. According to some embodiments, from this transformation, the neuromodulation system 100 can derive transducer displacement and initiate updated beam focusing protocols.

According to some embodiments, the determined series of 3D points can be interpolated into a 2D contour map that matches the spatial sampling frequency of the existing surface 308, which in some embodiments, may be an ultrashort echo time MRI image. ICP analysis may be performed between the ultrasound and MRI generated mappings. The processing time and quality of results of an ICP analysis depends on how close the point clouds are initially to an optimal fit. For example, if the clouds represented by t and the temporal window surface 310 are close in orientation and position, the algorithm will require less iterations to converge on the optimal fit and will likewise be less prone to converge on a local optima that is not the true best fit. Accordingly, and as best shown in FIGS. 3A-3B, it is important to identify a section of the temporal window 310 as a seed location rather than providing the entire skull surface as the search space. By processing several hundred MRIs associated with various patients, conserved brain features proximal to the temporal window 310 were identified and a head surface mesh integration algorithm can be used to effectively position the ultrasound transducer array 140 of the neuromodulation device 110 orthogonal to the identified conserved brain features, which results in the ultrasound transducer array 140 being initially positioned near the center of the temporal window 310.

Figure 4:
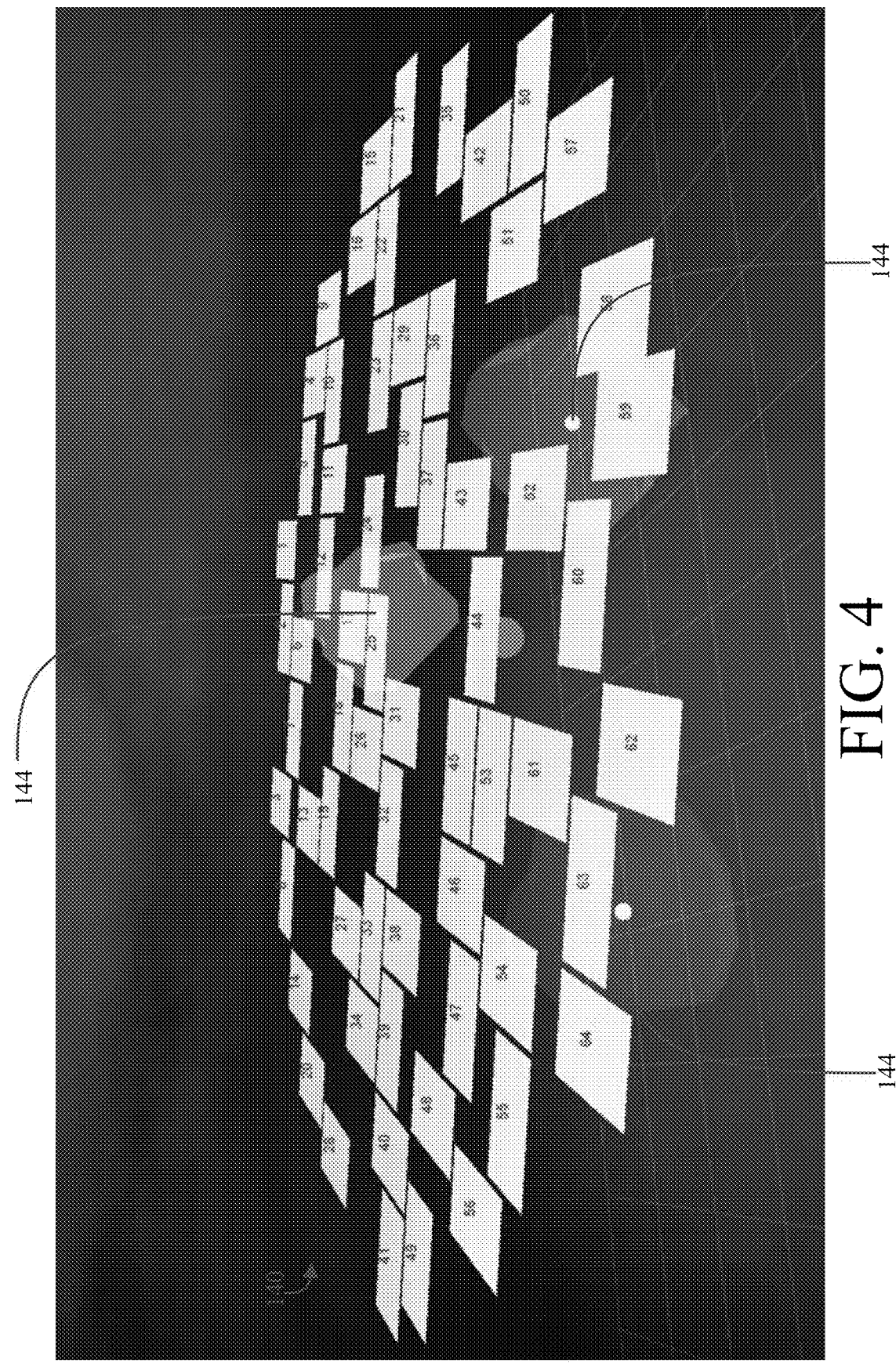
FIG. 4 depicts one or more imaging ultrasound elements that are used to detect whether an exemplary neuromodulation device worn by a user has shifted with respect to the user's temporal window, according to aspects of the present disclosure.

Once the ultrasound-emitting elements 142 and the imaging ultrasound elements 144 of the ultrasound transducer array 140 are registered to the existing surface 308, the imaging ultrasound elements 144 can act as fiducials which have a known spatial relationship to the ultrasound-emitting elements 142 in the MRI space of existing surface 308 as best shown in FIG. 4. The imaging ultrasound elements 144 provide a notable improvement over previously described markers that statically relate the position of the ultrasound-emitting elements 142 in relation to the skull, irrespective of placement error. As best shown in FIG. 4, ultrasound-emitting elements 142 are placed relative to an unequivocal plane formed by three imaging ultrasound elements 144.

In some embodiments, acoustic simulations necessary for cranial self-registration can take several minutes to complete using a powerful computing system leveraging numerous GPU cores and a large amount of RAM. Because the acoustic simulation is computationally and temporally expensive, the time it takes to process the acoustic simulation may exceed the duration of slow waves that are desired to be enhanced via the disclosed neuromodulation system 100. Thus, in certain embodiments, an alternative algorithm can be utilized in place of an acoustic simulation to increase the processing speed of cranial self-registration.

Figure 2C:
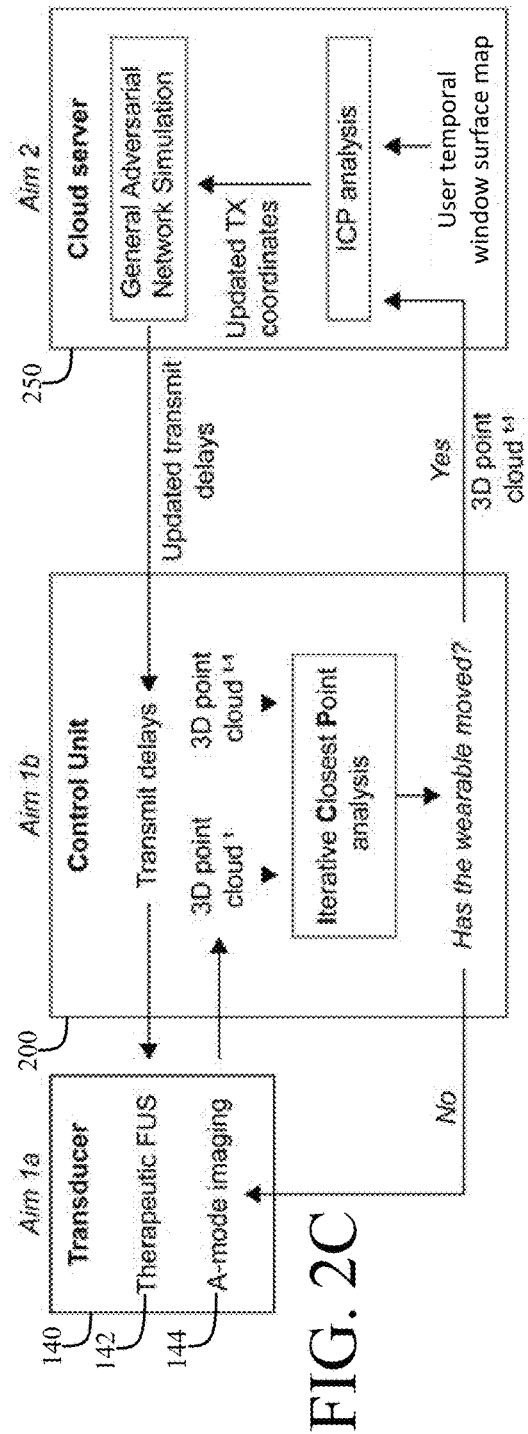
FIG. 2C is a schematic representing control logic enabling an exemplary neuromodulation system to automatically detect a shift in the one or more ultrasound-emitting elements and recalculate beam steering parameters for refocusing the emitted ultrasound waves to a target brain region of a user, according to aspects of the present disclosure.

For example, and as shown in FIG. 2C, a generative adversarial network (GAN) may be used to generate synthetic data of the human skull computed tomography (CT) for purposes of training radiological deep learning algorithms. The GAN can be trained by collecting and segmenting sub skull sections from sample MRI image data (e.g., ultrashort echo time MRI image data) to create a training image data dataset of skull segments. The GAN can be trained by iteratively simulating positions of the ultrasound transducer array 140 and running traditional acoustic simulation methods. According to some embodiments, the aforementioned GAN can be implemented on computing device 250 (FIG. 1A).

In some embodiments, an automated system which uses rapid field estimation through Schlieren imaging can iteratively modify speed of sound estimation parameters while assessing accuracy in order to improve accuracy of the simulation underlying the GAN training. The aforementioned automated system can include functions relating voxel intensity to density, density mapping to speed of sound, and the level of spatial convolution. According to some embodiments, determining the level of spatial convolution can prevent aliasing artifacts within the GAN simulation and can eliminate critical structural components when the level of spatial convolution is in excess. Completion of the GAN simulation allows the combination of temporal bone surface imaging, optimized ICP analysis, and simulation derived focusing to occur in several seconds rather than minutes.

According to some embodiments, the performance of a neuromodulation system 100 can be validated by creating an end-to-end automated testing setup with a robotic arm whereby the arm randomly changes the position of a temporal bone fragment and the center coordinate of a scanning hydrophone within a given lateral field size. Both the center position of the hydrophone, which acts as the expected target location, and the bone fragment, can undergo the same displacement to mimic transducer movement during nightly wear by a user/patient of neuromodulation system 100. Success can be demonstrated when the neuromodulation system 100 dynamically focuses within 1 mm of an intended target following a omnidirectional shift of 2+ mm of bone fragments and the scanning hydrophone. Shifting vectors can be assigned randomly in an automated and stepwise manner to validate performance of the neuromodulation system 100.

In another embodiment of the disclosure more fully described with respect to FIGS. 5-9, the neuromodulation system 100 can be configured to track shifts in the position of ultrasound-emitting elements (e.g., ultrasound-emitting elements 142 and/or imaging ultrasound elements 144) with respect to the temporal window of a user of the neuromodulation system 100 after the neuromodulation device 110 is initially registered to the user. However, it should be noted that in some embodiments, initially registering the device to the user is not necessary to track shifts in the position of the ultrasound-emitting elements with respect to the temporal window of a user (e.g., when utilizing the embodiment described in more detail with respect to FIGS. 2A-2C and FIGS. 3A-3B).

Figure 6:
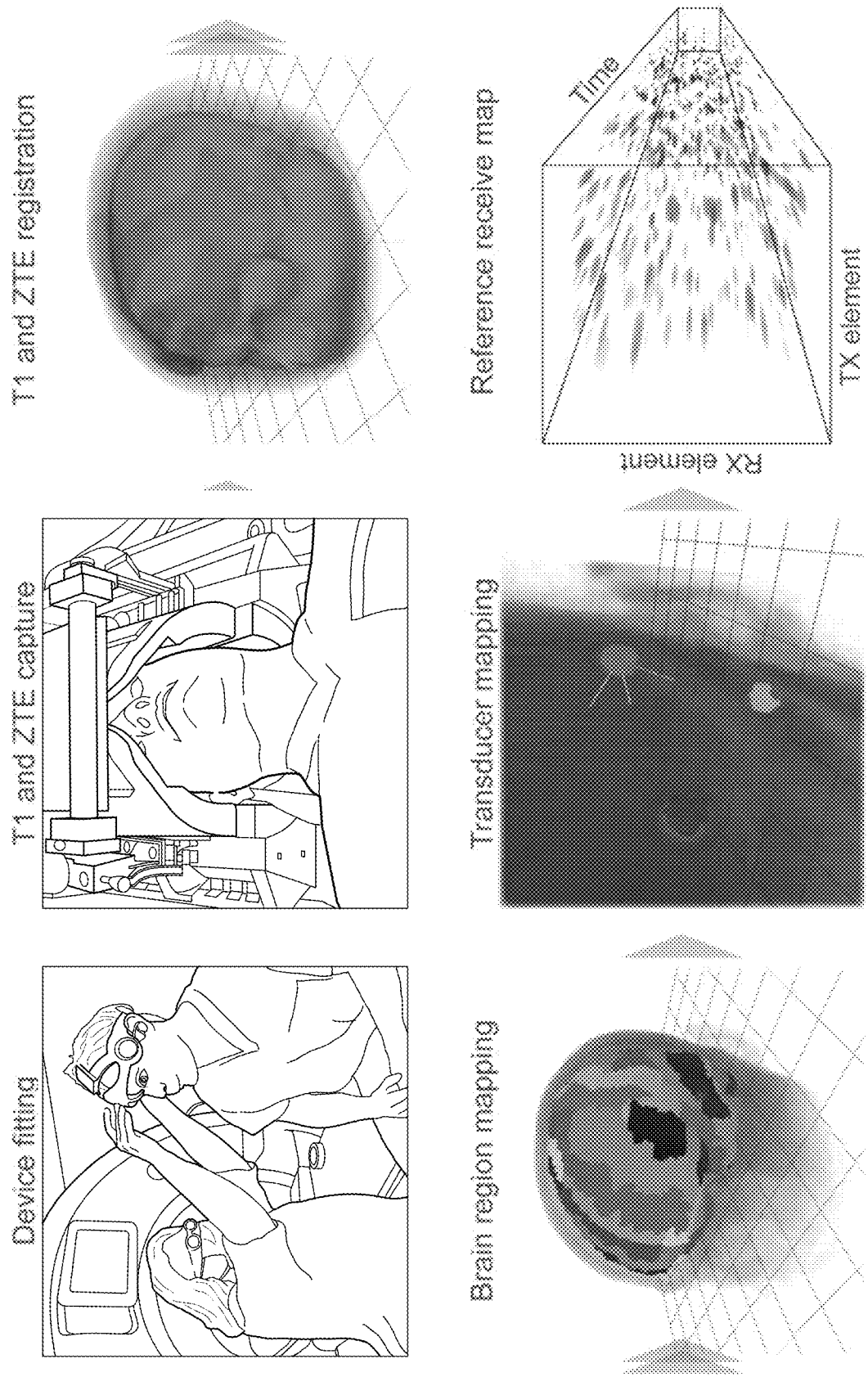
FIG. 6 depicts an exemplary process for initially registering a neuromodulation device to a user, according to aspects of the present disclosure.

Turning to FIG. 6, according to some embodiments, prior to therapeutic application of neuromodulation system 100, a user would first be fitted with a wearable neuromodulation device 110 of the correct size to limit motion of the transducers (e.g., ultrasound-emitting elements 142 and/or imaging ultrasound elements 144) as much as possible. This fitting might include the use of adjustable straps or foam padding inlining the wearable. The user may then wear the device with transducer fiducial markings during capture of a cranial image which can approximate acoustic information. This image may be a CT, MRI, or any imaging modality that can serve as an acoustic information source but is herein referred to as CT/MRI. Next, a reference ultrasound volumetric signal set ($UV_{REF}$) would be captured during a CT/MRI scan or while the user is immobile inside of the scanner. If the control unit normally tethered to the device is not MRI compatible, the capture ultrasound volumetric signals of the array can be taken in rapid succession outside of the MRI room to limit any motion of the device on the cranium between data collection. This ensures that the position of the transducer relative to the cranium is as similar as possible between the $UV_{REF}$ and the MRI/CT volume.

In a neuromodulatory device, such as the neuromodulation system 100 described here, low frequency ultrasound pulses can be emitted with substantial amplitude from any number of elements within an array. In the same regard, any number of elements can also act as receivers. In one embodiment, acoustic simulations can be performed using all elements of a 64 channel array as both emitters and receivers where each element was individually pulsed with a single waveform while all receivers listened to the temporal response. The data represents complex interactions with waves reflecting and refracting within the cranium. It should be understood that the neuromodulation system 100 can have more or less than 64 ultrasound elements in some embodiments.

During therapeutic use, the device can periodically collect $UV_{RT}$ data through an event or time-based trigger. Event based triggers could be related to user motion, or sensors indicating the device has moved on the head. The $UV_{RT}$ data is fed into the displacement detection algorithm which returns a transformation and rotation matrix. These matrices are applied to the transducer element positions identified in the acoustic simulation space created using the initial CT/MRI scan. The acoustic simulation can then be rerun using the updated element positions and the updated ultrasound phases can be returned to the device.

Figure 7A:
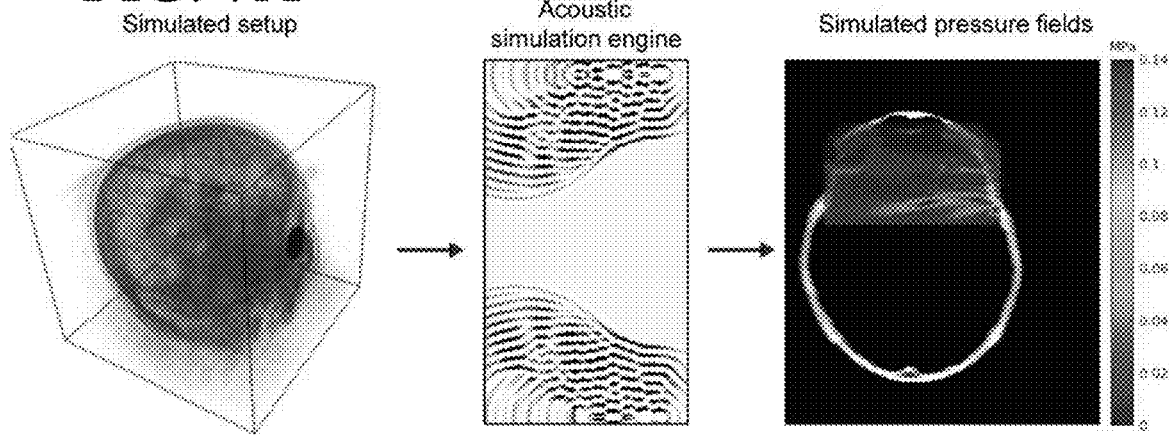
FIG. 7A depicts a method of performing an acoustic simulation of the cranium of a patient, according to aspects of the present disclosure.
Figure 7B:
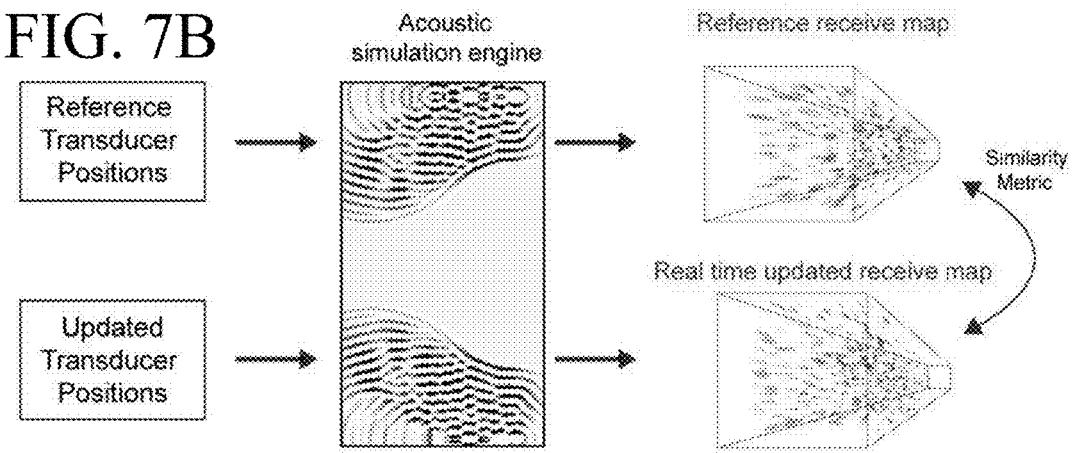
FIG. 7B depicts another method of performing an acoustic simulation of the cranium of a patient, according to aspects of the present disclosure.

A component of this algorithm is a module that simulates the propagation of acoustic waves throughout the patient's skull and brain from an arbitrary set of transducer locations. This simulation module may have varying implementations where the inputs are defined as p, which represents a matrix of all transducer element positions, T, which are the transmitted acoustic waves originating from each element, and $A_{sp}$, which represents the fixed three-dimensional acoustic property map for the user. The output of this simulation is an acoustic pressure field that is varying over time. These pressure fields are sampled at the transducer element positions. This is referred to as R, which is the measurement at each transducer element position as the waves have propagated through the medium for a fixed duration. The duration should be sufficiently long to capture highly reflected waves within the skull. FIG. 7A shows a depiction of a possible simulation. This simulation module can be used within the system's main algorithm. A purpose of this algorithm is that, given $p_{REF}$, $T_{REF}$, $R_{REF}$, $T_{RT}$, and $R_{RT}$, to find the corresponding $p_{RT}$. In at least some embodiments of this algorithm, a similarity metric is used to compare $p_{REF}$ and $R_{RT}$, such as cross-correlation or mutual information. This algorithm can be implemented in several ways:

In one embodiment of this algorithm, the acoustic simulation is differentiable, allowing for $T_{REF}$ and $T_{RT}$ to be directly compared using a similarity metric, and this difference can be propagated backwards to the inputs, iteratively providing gradient differences in the inputs and generating $p_{NEXT}$. FIG. 7B shows a depiction of this algorithm.

Figure 7C:
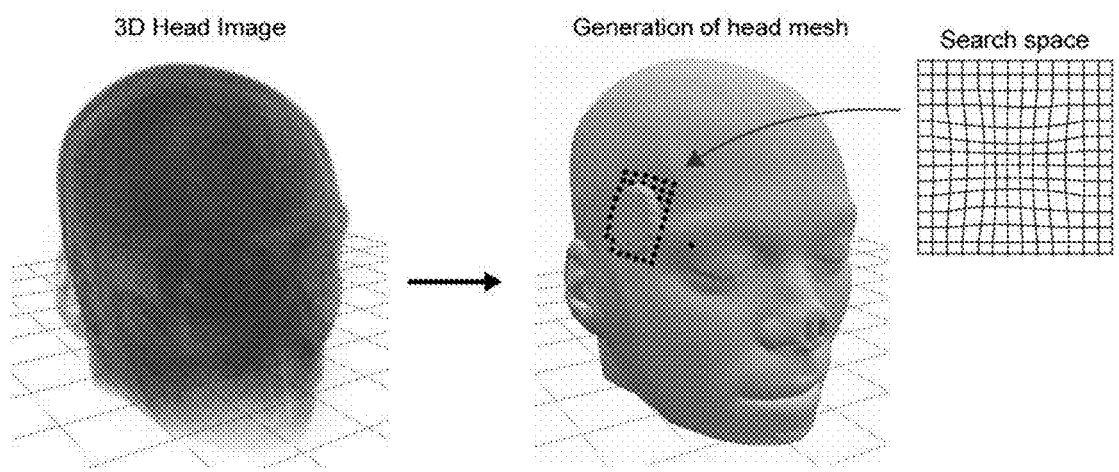
FIG. 7C depicts yet another method of performing an acoustic simulation of the cranium of a patient, according to aspects of the present disclosure.

In another embodiment of this algorithm an exhaustive search of all feasible transducer positions is performed. The search can be optionally bounded by the manifold representing the outer contour of the user's head, or by any other physical constraints that reduce this search space. This would dramatically reduce computation time by reducing the number of orientation and position permutations to those which do not penetrate the head mesh surface. FIG. 7C shows an implementation of this algorithm.

In yet another embodiment of this algorithm, a machine learning model uses as input $p_{REF}$, $T_{REF}$, $R_{REF}$, $T_{RT}$, and $R_{RT}$, and outputs the estimated $p_{RT}$. This model would have previously been trained on a large dataset of measured data, where both the displacements and changes in transducer measurements are known. This embodiment would not require a simulation for determining the displacement. However, the simulation could still be used for optimal phase aberration correction for each transducer element. Training data can be obtained using iterative transducer displacement in acoustic simulations or a mechanical process in which the actual transducer elements are mechanically shifted on a phantom while recording $UV_{RT}$.

Once the $p_{RT}$ is computed using one of the methods described with respect to FIGS. 7A-7C, various types of acoustic simulation approaches can be used to simulate wave propagation and to compute required phase delays for focusing on a target. Some examples include the finite difference time domain and hybrid angular spectrum method pseudospectral, finite differences, and boundary element methods. Following simulation of wave propagation, ultrasound focusing can be performed by time reversal of signals received by placing an ultrasound generating source at the target region.

In one embodiment of this device, the ultrasound arrays are interfaced to the cranium using a semi rigid, ergonomic wearable device (e.g., neuromodulation device 110, described with respect to FIGS. 1A-1C). Adhesive padding with varying thickness can also be used to customize the fit. The contouring around the forehead along with facial registration features allow for highly consistent placement of the device across sessions. The consistent fit is desired even with the corrective techniques applied here since some of the algorithms described require iterative force search of transducer position across unconstrained space.

Figure 8:
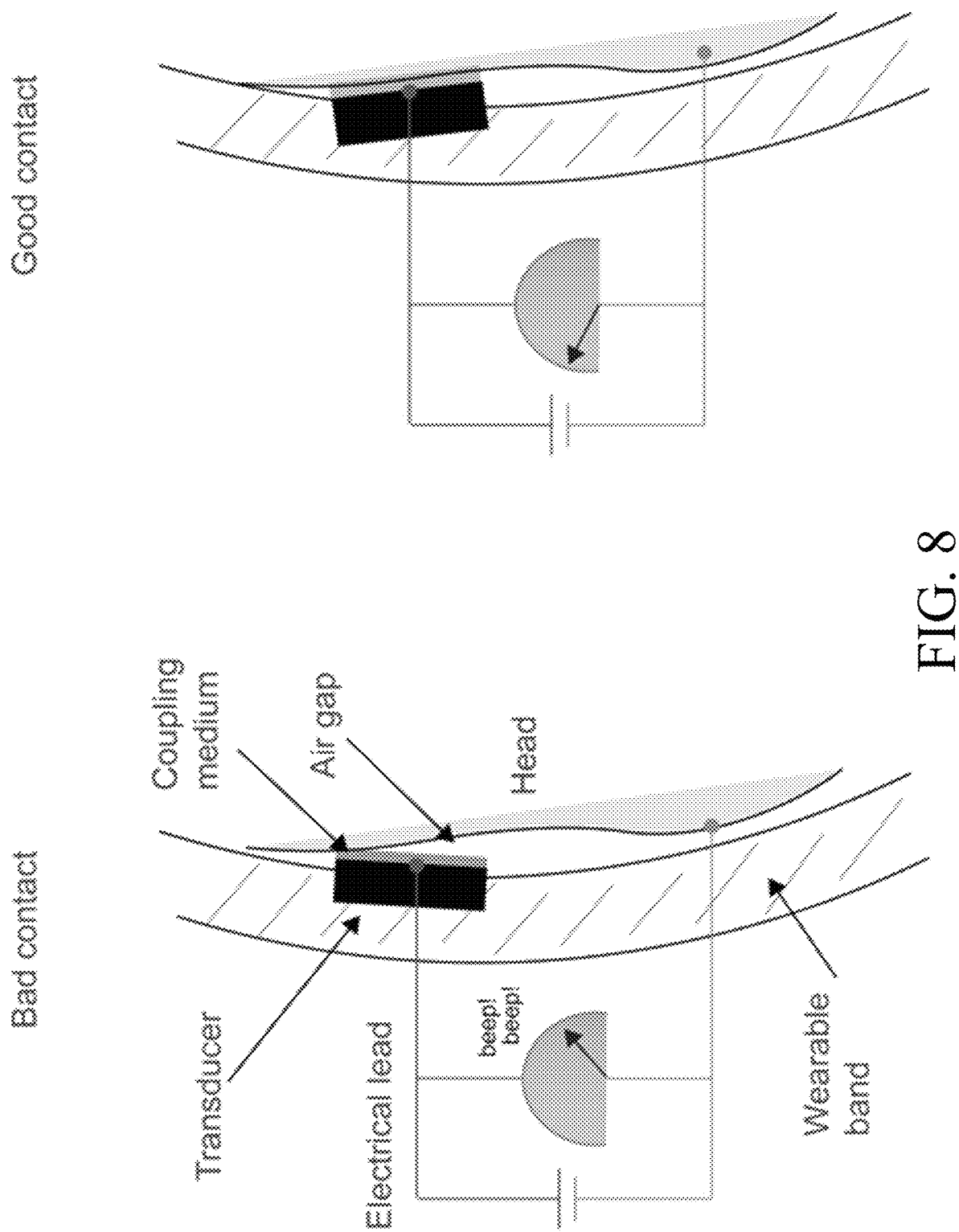
FIG. 8 depicts a closed loop detection algorithm which detects motion of a transducer element relative to the cranium, according to aspects of the present disclosure.

Given the computational complexity of the displacement estimation algorithms and acoustic simulations, it may be beneficial to avoid unnecessarily repeating the processes described herein. For instance, if a patient is lying still on their back, the device is unlikely to move relative to the cranium. Thus, a repeated calculation of updated phases may be returning the same solution while blocking the computational resources from performing alternative functions. To limit computation to periods when it is necessary or advantageous, the device may implement a closed loop detection algorithm which only performs the correction when the device detects motion of the transducer elements relative to the cranium. In another embodiment, the motion of the transducer relative to the cranium may be detected by monitoring electrical impedance of a circuit containing both the coupling medium and the patient skin, as shown in FIG. 8. This coupling medium could be an ultrasound coupling pad, ultrasound gel, the ultrasound transducer faceplate, or the ultrasound transducer itself. In one embodiment, an electrical contact is placed in contact with the coupling medium and an additional electrical lead placed somewhere on the patient's skin. It should be noted that the closed loop detection algorithm disclosed in FIG. 8 can be utilized with any of the aforementioned embodiments consistent with this disclosure (e.g., any of the embodiments described with respect to FIGS. 1-9). During wear, the system will monitor changes in capacitance which exceed a given threshold at which point the system can trigger the real time phase aberration correction with volumetric ultrasound image registration. The system can also be used to alert the user when the contact is insufficient for treatment through use of a tone, light, or other sensory stimuli.

Figure 9:
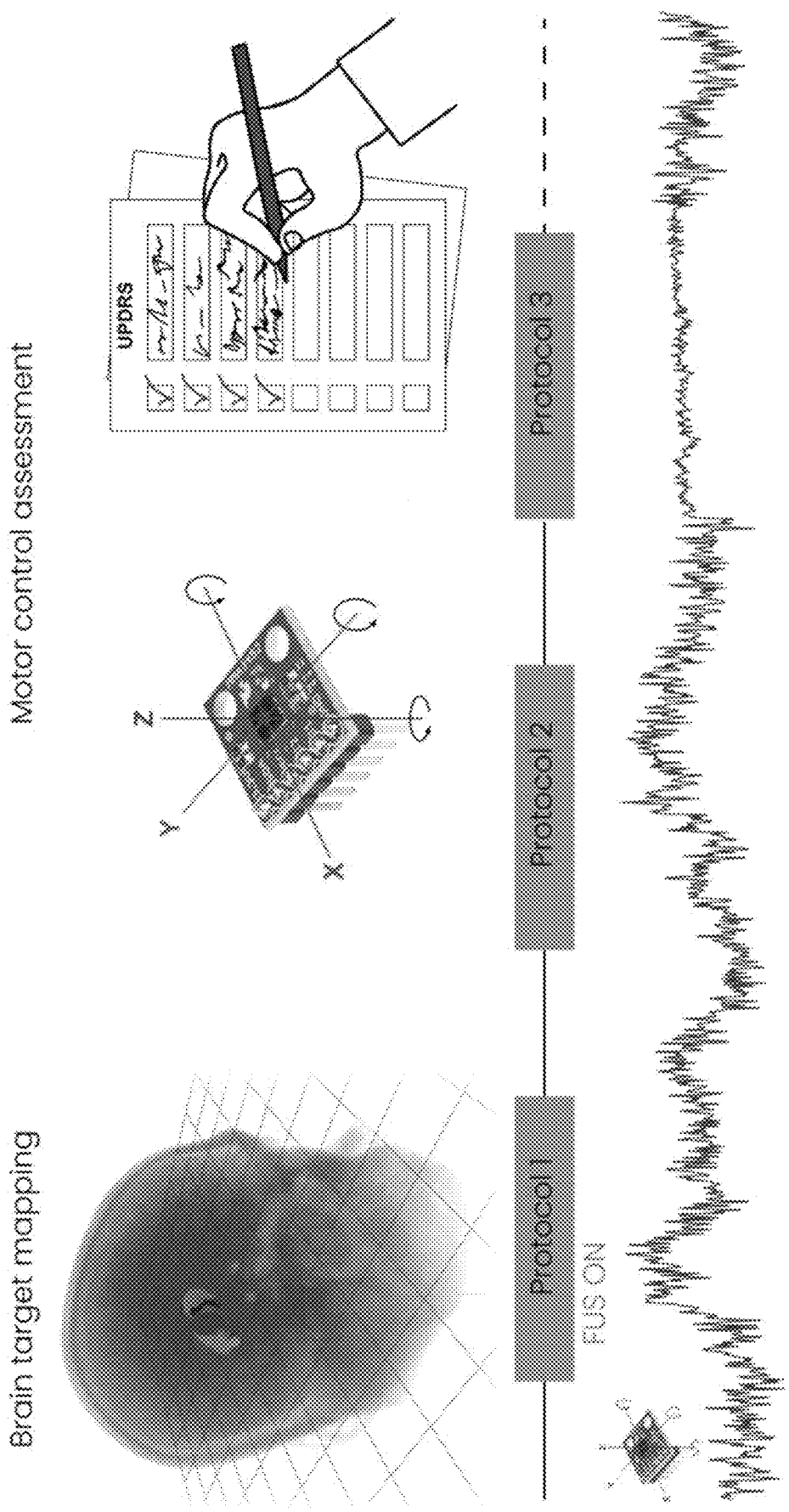
FIG. 9 depicts an exemplary methodology to assess efficacy of the disclosed system in providing treatment for Parkinson's disease or essential tremor, according to aspects of the present disclosure.

FIG. 9 depicts an exemplary pre-surgical assessment of efficacy of the disclosed neuromodulation system 100 in providing treatment for Parkinson's disease (PD). Deep brain stimulation (DBS) targeting of deep brain nuclei is an increasingly common treatment option for PD and has demonstrated long term success in reducing motor pathologies. Although 24% of the PD population is eligible for DBS, only 5% of these candidates are willing to undergo the procedure. Several studies found that the primary reasons for reluctance in the majority included fear of inefficacy, side effects such as deterioration of speech or personality change, and surgical complications. Even neurologists are hesitant when considering candidates for DBS, as they substantially overestimate the risk of surgical complications. In some respect, the imperfect efficacy and side effect profile may warrant these concerns.

Although PD has been studied extensively, the brain origins of the various pathologies are not always fully understood. Primary candidate targets include subthalamic nuclei of the thalamus, Globus pallidus interna (GPI), and Ventral Intermediate Nucleus of the Thalamus, all of which have deep connectivity to the substantia nigra. Even within these larger brain regions, certain spatial subsets are thought to have varying levels of contribution, evidenced by the need to titrate voltage and spatial range to achieve effects. Despite numerous clinical studies comparing the benefits of each target, it is unclear whether any offers superior clinical outcomes. As a result, the brain target is often selected based on the probability of side effects in a given patient. For instance, the GPi is typically favored over the subthalamic nucleus for patients suffering from depression or dementia. Thus, it is possible that non-optimal target selection is responsible for the ~25% of patients who do not experience symptom relief. Furthermore, it is unknown whether stimulating multiple targets might have additive benefits. The lack of certainty in these treatments invites the use of reversible, non-invasive treatment modalities such as focused ultrasound for several purposes.

In one embodiment, a device consistent with the disclosed embodiments herein could perform pre-surgical assessment of multiple target's potential efficacy through iterative focused ultrasound exposure, as shown in FIG. 9. Such tests could include the Motor Unified Parkinson's Disease Rating Scale Examination. As a secondary correlated measure, automated monitoring of head and hand tremor detected through accelerometry built into the wearable could also be used. Such an application of this technology could lower the portion of non-responders, increasing both patient and physician confidence in the surgery and the number of candidates opting in. Alternatively, the device could be used temporarily in situations which require rapid relief of motor symptoms. While the application of focused ultrasound for Parkinson's patients is clear from a therapeutic standpoint, the practical aspects are far more complicated. These patients are often subject to both whole body tremor and limb rigidity, limiting their ability to perform simple motor tasks such as tying shoelaces or basic use of utensils. Thus, it is unlikely these patients would be able to reliably place a cranially worn device, even with the presence of special fit tools or an aid. Furthermore, repetitive shaking of the head may slowly shift the device over time, irrespective of initial placement error. The technology described here remedies the issues associated with both poor placement and device spatial drift over time and allows for consistently targeted focused ultrasound neuromodulation in Parkinson's patients.

In another embodiment, focused ultrasound is used to modulate the efficacy of sleep. Numerous brain regions and cell types within those regions have been identified as sleep regulators and can modulate sleep through optogenetic or designer drug targeted manipulation. In another embodiment, the device could be used to temporarily stimulate regions responsible for slow wave rhythms to improve synaptic downscaling and/or metabolite clearance in the brain. Furthermore, metabolic clearance from the brain during sleep may be aided by acoustic streaming effects through targeting of cerebrospinal fluid channels. The use of focused ultrasound allows for translation of these findings without genetic manipulation. Polysomnography is a method used to monitor sleep and employs numerous electrodes and sensors attached to a subject's head. While these sensors can typically monitor sleep during a quiescent state, many signals are interrupted frequently during the night through mechanical perturbation from pillows, blankets, limb contact, and the subject's partner. Similar effects would be expected with the wearable device described herein. If left uncorrected, a device would likely experience accumulated focal targeting error throughout the night, lowering or completely abolishing any therapeutic benefits of the device. Thus, the methods described here are particularly useful for focused ultrasound modulation therapies during sleep.

In yet another embodiment, physical or task training exercises may benefit from the use of focused ultrasound targeted to arousal or cognitive systems in the brain including the locus coeruleus, the ventral tegmental area, or the prefrontal cortex. The supplemented tasks may involve high levels of mental and physical exertion which could place both mechanical force on the device coupled with increased perspiration. The resulting transducer element offsets would benefit from the corrective measures described herein.

It should be noted that processing of data and algorithms described herein may be performed by system components implemented in hardware or a combination of hardware and software (see exemplary description of components in FIGS. 1A-1C). As an example, such system a component may include at least one processor, such as a digital signal processor (DSP) or central processing unit (CPU), configured to executes instructions stored in memory for performing the functions described herein. In some embodiments, application-specific integrated circuits (ASICs) or gate arrays, such as field-programmable gate arrays (FPGAs), may be used to implement any of the functions described herein. Various configurations of circuitry for the processing of data and algorithms described here are possible.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices, and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

With reference to the use of the word(s) "comprise," "comprises," and "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and/or the following claims.

The term "including" should be interpreted to mean "including but not limited to . . . " unless the context clearly indicate otherwise.

The term "consisting essentially of" means that, in addition to the recited elements, what is claimed may also contain other elements (steps, structures, ingredients, components, etc.) that do not adversely affect the operability of what is claimed for its intended purpose. Such addition of other elements that do not adversely affect the operability of what is claimed for its intended purpose would not constitute a material change in the basic and novel characteristics of what is claimed.

The term "adapted to" means designed or configured to accomplish the specified objective, not simply able to be made to accomplish the specified objective.

The term "capable of" means able to be made to accomplish the specified objective.

The terminology used herein is for the purpose of describing particular embodiments only and is not intended to be limiting. As used herein, the singular forms "a", "an" and "the" are intended to include the plural forms as well (i.e. "at least one"), unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

What is claimed is:

1. A method for real time ultrasound focusing on a brain target or a plurality of brain targets, comprising:
providing a cranially worn focused ultrasound neuromodulation device which includes one or more ultrasound emitting and receiving elements;
sequentially capturing a reference receive data and a real time volumetric ultrasound receive data of the cranium during use of a neuromodulation device;
determining a displacement relative to a reference position by performing a spatial search constrained by a head mesh created using an MRI, CT, or other cranial imaging that can serve as an acoustic information source
wherein the spatial search compares simulated ultrasound transmit/receive signals at numerous position/orientation permutations on the skull to the real time ultrasound receive data;
updating the ultrasound element positions based on the determined displacement in an acoustic simulation model that includes the brain target and acoustic information; and calculating transmit-phase values or time delays for the ultrasound elements based on the updated ultrasound element positions such that the ultrasound is focused on the target or plurality of brain targets.

2. The method of claim 1, wherein the ultrasound transducer elements used for producing the ultrasound signals are the same as the ultrasound elements used for delivery of therapeutic ultrasound for neuromodulation.

3. The method of claim 1, wherein the ultrasound signal is produced using ultrasound at a low frequency below 1 MHz.

4. The method of claim 1, wherein an image space of the simulated ultrasound transmit/receive signals which is registered to the reference receive data and contains a brain target and acoustic information is derived from a computed tomography scan, or a magnetic resonance image scan.

5. The method of claim 1, wherein the ultrasound receive data is captured using a 2D ultrasound array embedded within a head wearable.

6. The method of claim 1, wherein the ultrasound receive data is captured using a 2D ultrasound array which is interfaced directly or indirectly to the temporal window of the skull.

7. The method of claim 1, wherein a differentiable acoustic simulation is performed using real time recorded ultrasound transmit receive data to estimate the position of the ultrasound element sources.

8. The method of claim 1, wherein the device calculates ultrasound transducer element displacement using a machine learning algorithm trained to predict ultrasound transducer element displacement from a reference ultrasound receive signals set and real-time ultrasound receive signals.

9. The method of claim 8, wherein the machine learning algorithm is trained using acoustic simulations.

10. The method of claim 1, wherein the updating computation of updated phase or time delays is only performed when the device has detected motion from an initial position relative to the cranium or skull that exceeds a defined threshold.

11. The method of claim 1, wherein the computation of updated phase or time delays is only performed when the device detects changes in electrical impedance across a circuit which incorporates the user's skin, the ultrasound transducer elements, and any layers between the skin and transducer ultrasound elements.

* * * * *